United States Patent [19]

Matsui et al.

[11] Patent Number: 4,648,308
[45] Date of Patent: Mar. 10, 1987

[54] INTERNAL COMBUSTION ENGINE PISTON AND A METHOD OF PRODUCING THE SAME

[75] Inventors: Minoru Matsui, Nagoya; Nobuo Tsuno, Kasugai, both of Japan

[73] Assignee: NGK Insulators, Ltd., Japan

[21] Appl. No.: 708,397

[22] Filed: Mar. 5, 1985

[30] Foreign Application Priority Data

Mar. 12, 1984 [JP] Japan .................. 59-46653

[51] Int. Cl.[4] ............................................. F02F 3/12
[52] U.S. Cl. ...................... 92/212; 29/156.5 R; 92/213; 92/224; 92/231
[58] Field of Search ............ 29/156.5 R; 92/176, 92/212, 213, 218, 220, 222, 224, 231, 248, 260; 123/193 P, 669

[56] References Cited

U.S. PATENT DOCUMENTS 4,538,562 9/1985 Matsui et al. .................. 92/212 X

FOREIGN PATENT DOCUMENTS 3214093 10/1983 Fed. Rep. of Germany ........ 92/212
60306 5/1979 Japan .
48327 4/1983 Japan .
74853 5/1983 Japan .

Primary Examiner—Gerald A. Michalsky
Attorney, Agent, or Firm—Parkhurst & Oliff

[57] ABSTRACT

Disclosed herein is an internal combustion engine piston comprising a piston cap formed from a plurality of ceramic pieces, and a metal piston body, the piston cap being fixed to the top portion of the metal piston body, wherein the piston cap is made of one or more types of ceramic materials, and the ceramic pieces constituting the ceramic cap and the metal piston body are bonded together through a metallized layer coated onto the ceramic pieces and a metal-plated layer coated onto the metallized layer in such a manner that the bonding area between the ceramic piece or pieces and the metal piston body may be larger at a top central portion of the metal piston body than that between the ceramic piece or pieces and the metal piston body at another portion thereof. Also disclosed is a method of producing the same.

11 Claims, 4 Drawing Figures

INTERNAL COMBUSTION ENGINE PISTON AND A METHOD OF PRODUCING THE SAME

BACKGROUND OF THE INVENTION (1) Field of the Invention:

The present invention relates to an internal combustion engine piston in which a piston cap constituted by a plurality of ceramic pieces is fixed to the top portion of a piston body made of a metal, and a method of producing the same.

(2) Description of the Invention:

Since ceramic materials have excellent mechanical strength, heat resistance, oxidation resistance, and heat insulating properties, when a portion of piston, a cylinder liner, a cylinder head and so on of an internal combustion engine, which portion is to be brought into contact with a high temperature combustion gas, is constituted by a ceramic material, an increase in combustion temperature and a reduction in heat loss can be attained so that effects such as improved engine efficiency and reduction in the harmful components in the exhaust gas can be expected. Thus, there have been proposed internal combustion engine pistons in which a piston cap made of ceramics is fixed to the top portion of a metal piston body.

Engine pistons in which the ceramic piston cap is fixed to the top portion of the metal piston body are disclosed in, for instance, Japanese Patent Application Laid-Open No. 74,853,/1983, U.S. Pat. Nos. 4,404,935 and 4,245,611. Among them, Japanese Patent Application Laid-Open No. 74,853/1983 and U.S. Pat. No. 4,404,935 disclose pistons in which a ceramic piston cap having an integral structure is fixed to the top portion of a metal piston body through casting or engagement. In general, since the ceramic material has a lower heat conductivity, there occurs a large difference in temperature between the high temperature combustion gas-contacting surface and the metal piston body-contacting surface of the ceramic piston cap which is fixed to the top portion of the metal piston body. Therefore, the ceramic piston cap with such an integrated structure has the drawback that the piston cap tends to be broken due to thermal stress caused by the large temperature difference, and this tendency becomes conspicuous as the size of the piston increases.

On the other hand, U.S. Pat. No. 4,245,611 discloses a piston in which a piston cap constituted by a plurality of ceramic pieces is fixed to the top portion of a metal piston body through casting. According to this piston, a cushioning layer composed of ceramic fibers is provided around the piston cap to mitigage the stress caused through the casting. However, this structure has the drawback that the fixing of the ceramic piston cap to the metal piston body becomes insufficient due to the presence of the cushioning layer so that the piston cap becomes loose when the piston is in use. Further, Japanese Patent Utility Model registration Publication No. 48,327/1983 and Japanese Patent Application Laid Open No. 60,306/1979 disclose pistons in which a molten metal is directly cast around a piston cap constituted by a plurality of ceramic pieces. However, the method by which the piston cap is split into the plurality of ceramic pieces is insert cast and fixed to the top portion of the metal piston body has the drawback that the assembling of the piston cap into a mold is complicated, and therefore this method is unsuitable for mass production.

SUMMARY OF THE INVENTION

It is therefore an object of the present invention to provide an internal combustion engine piston which obviates the drawbacks encountered by the prior art engine pistons.

More specifically, the object of the present invention is to provide an internal combustion engine piston having excellent heat insulating properties, heat resistance, and/or corrosion resistance with a ceramic piston cap which is firmly fixed to the top portion of a metal piston body and is not broken by thermal stress and thermal shock.

It is another object of the present invention to provide a method of producing such an internal combustion engine piston.

It is still another object of the present invention to provide a method of producing an internal combustion engine piston by which a ceramic piston cap is bonded to the top portion of a metal piston body without being broken.

According to a first aspect of the present invention, there is a provision of an internal combustion engine piston in which a piston cap constituted by a plurality of ceramic pieces is fixed to the top portion of a metal piston body, the piston cap is made of one or more kinds of ceramic materials, and the ceramic pieces constituting the ceramic cap and the metal piston body are bonded together through a metallized layer coated onto the ceramic pieces and a metal-plated layer coated onto the metallized layer in such a manner that the bonding area between the ceramic piece or pieces and the metal piston body may be larger at the top central portion of the piston body than that between the ceramic piece or pieces and the metal piston body at any other portion.

According to another aspect of the present invention, there is a provision of a method of producing an internal combustion engine piston by fixing a piston cap constituted by a plurality of ceramic pieces to the top portion of a metal piston body, which comprises the steps of: forming the piston cap from one or more kinds of ceramic materials, coating the surface of at least one ceramic piece constituting the ceramic cap which is to be faced with and bonded to the metal piston body with a metallized layer, coating the surface of the metallized layer with a metal plating layer, arranging the ceramic pieces in a depression formed at the top portion of the metal piston body, and bonding the piston cap and the metal piston body together through the metallized layer on the ceramic pieces and the metal plated layer coated on the metallized layer such that the bonding area between the ceramic piece or pieces and the metal piston body may be larger at the central top portion of the piston body than that between the ceramic piece or pieces and the metal piston body at any other portion.

These and other objects, features and advantages of the invention will be appreciated upon reading of the following description of the invention when taken in conjunction with the attached drawings with understanding that some modifications, variations and changes of the invention could be easily made by the skilled in the art to which the invention pertains without departing from the spirit of the invention or the scope of claims appended hereto.

BRIEF DESCRIPTION OF THE DRAWINGS

For better understanding of the invention, reference is made of the attached drawings, wherein.

DETAILED DESCRIPTION OF THE INVENTION

Figure 1:
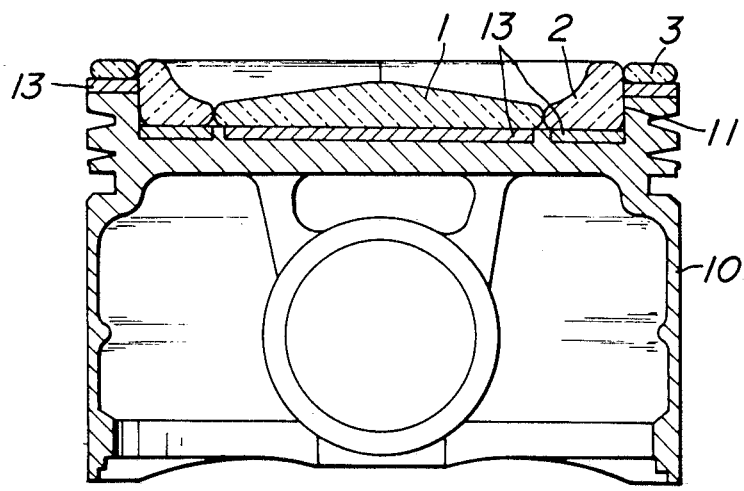
FIG. 1 is a schematic view illustrating a vertical section of an embodiment of the internal combustion engine piston according to the present invention.

According to the present invention, a piston cap is constituted by a plurality of split ceramic pieces. This reduces the thermal stress caused by the difference in temperature between the surface of the ceramic pieces constituting the piston cap which is brought into contact with a high temperature combustion gas and the surface of the ceramic piece which is in contact with the metal piston body to prevent the piston cap from being broken when an engine is in operation. Further, in a step during which one or more ceramic pieces constituting the piston cap is bonded to the top portion of the metal piston body and then cooled, the stress developed due to the difference in the coefficient of thermal expansion between the materials constituting the ceramic pieces and the metal piston body respectively is mitigated to prevent the piston cap from being broken.

The ceramic pieces constituting the piston cap are made of one or more kinds of ceramic materials selected from the group consisting of zirconia, alumina, silicon nitride, silicon carbide and sialon. The ceramic material to be used for the piston cap may be determined depending upon the thermal shock resistance characteristics, the corrosion resistance, the heat insulating property, and the thermal expansion characteristics of the ceramic material and the manner of fixing the piston cap to the metal piston body. For instance, while a portion of the piston cap which is subjected to a large thermal shock is preferably made of a ceramic material having a small coefficient of thermal expansion, such as silicon nitride and silicon carbide, a portion of the piston cap which is directly bonded to the metal piston is preferably made of a ceramic material having a coefficient of thermal expansion near that of the metal constituting the piston body, such as zirconia and alumina. However, although ceramic materials such as silicon nitride and silicon carbide have excellent thermal resistance and thermal shock resistance characteristics, their heat insulating property is poorer as compared with zirconia. Therefore, in the case of the engine piston which particularly requires a heat insulating property, such as a heat insulating engine piston, it may be that all the ceramic pieces constituting the piston cap are made of zirconia ceramics having an excellent heat insulating property, or that a portion of the piston cap is designed to have a plurality of layers in which the ceramic pieces at the surface layer portion which is brought into direct contact with the high temperature combustion gas is made of silicon nitride and those at the inner layer portion which is not contacted with the combustion gas is made of zirconia ceramics. As mentioned above, the piston having a large thermal shock resistance and an excellent heat insulating property can be obtained by changing the material which forms the ceramic pieces constituting the piston cap.

The configuration of the ceramic pieces constituting the piston cap is determined with due consideration being given to the configuration and size of the piston cap, the physical properties and the mechanical properties of the ceramic material, the manner of fixing the ceramic pieces and the metal piston, the feasibility of producing the ceramic pieces, the thermal conditions within an engine so that various thermal stresses expected to occur within the piston cap may not become larger than the fracture stress of the ceramic pieces. Any one of a horizontal surface, a vertical surface, an inclination surface, and a curved surface may be selected as the profile and inclination of the contact surface between the ceramic pieces constituting the piston cap depending upon the manner of fixing the ceramic pieces to the metal piston body, the profile of the ceramic pieces and so on.

The ceramic piece constituting the piston cap is fixed to the metal piston by depositing the metallized layer onto the surface of the ceramic piece which is to be faced with and bonded to the metal piston body, and bonding the metallized layer and the metal piston body together. In this case, while one or more ceramic pieces constituting the piston cap are coated with the metallized layer and the metallized layer is bonded to the metal piston body, the remaining ceramic piece or pieces may be fixed to the metal piston body by means of the ceramic piece or pieces bonded to the metal piston body or through engagement. The "metallized layer" used herein means a metallized layer which serves to metallize the surface of the ceramic piece and is formed on one of the opposite surfaces of the ceramic piece by coating it with a pasty composition consisting essentially of a metal powder, drying the coat, and heating it in a reducing atmosphere, a non-oxidative atmosphere or a hydrogen atmosphere in which the partial pressure of steam is adjusted.

As the metallizing layer to be deposited onto the ceramic piece, mention may be preferably made of a metallizing layer consisting essentially of one or more metals selected from Mo, W, Fe, Ni, Cr, Ti and so on. Among them, the metallizing layer consisting essentially of Mo is more preferable.

For the ceramic piece made of partially stabilized zirconia containing $Y_2O_3$, a metallizing layer consisting of 70–90% by weight of Mo, 0.5–15% by weight of MnO, 0.1–10% by weight of $Y_2O_3$, 0.1–15% by weight of $Al_2O_3$, and 0.1–15% by weight of $SiO_2$ is more preferable due to its large bonding strength.

The bonding between the metallized layer and the metal piston body may be performed either by brazing or diffusion bonding, and a brazing material and an insert metal for the diffusion bonding to be used are determined depending on the mechanical characteristics required at the bonded portion, such as bonding strength, fatigue strength, and high temperature strength. It is preferable that the metal plating is performed on either one or both of the surfaces of the metallized layer and the metal piston body where bonding is to be performed prior to the bonding between the metallized layer and the metal piston body so as to strengthen the bonding between the metallized layer and the metal piston body. The kind of the metal to be plated may be determined depending upon the materials of the metallizing layer, the metal piston body and the brazing material, and the bonding method, with due consideration being given to the prevention of the formation of a brittle intermetallic compound, the wetting of the brazing material and the feasibility of the mutual diffusion of the metals brought into contact with each other.

When the ceramic piece is brazed to the round plane surface, such as the top portion of the piston body, through brazing, and cooling is effected from the brazing temperature, the stress caused by the difference in the coefficient of thermal expansion between the metal and the ceramics is larger at the outer periphery than at the round central portion, and the stress at the outer periphery is in proportion to the bonding area. If the stress exceeds the fracture stress of the ceramics, the ceramic piece is broken. If it exceeds the bonding strength between the ceramics and the metal, the bonded surfaces are peeled.

According to the engine piston of the present invention, the piston cap is constituted by a plurality of ceramic pieces, the bonding area between each of the ceramic pieces and the metal piston body is made smaller, and the bonding area between the metal piston body and the ceramic piece or pieces at the outer peripheral portion is designed to be smaller than that between the metal piston body and the ceramic piece or pieces at the central top portion. Accordingly, neither fracture of the ceramic pieces nor the peeling of the bonding surfaces due to the above stress takes place.

The extent of the bonding areas between each of the ceramic pieces and the metal piston body is determined with due consideration being given to the difference in the coefficient of thermal expansion between the materials constituting the ceramic pieces and the metal piston body respectively, the bonding temperature, the mechanical strength of the ceramic material, the bonding strength, the presence or absence of a buffer metallic member between the ceramic pieces and the metal piston, and so on.

The bonding area may be adjusted by changing any of the area of the metallized layer coated onto the ceramic piece, the area of the metal plated layer coated onto the surface of the metallized layer and the size of the ceramic pieces. The adjustment is preferably made by changing the area of the metallized layer.

When the difference in the coefficient of thermal expansion between the ceramic piece coated with the metallized layer and the metal piston body is such that the ceramic pieces are broken, or a large residual stress is produced in the ceramic pieces during the bonding between the ceramic pieces and the metal piston body, it is preferable that the bonding is performed while a buffer metallic member having a coefficient of thermal expansion of not higher than $14 \times 10^{-6}(°C^{-1})$, such as ferritic stainless steel, Fe-Cr alloy, Fe-Cr-Ni alloy, Fe-Ni alloy, Fe-Ni-Co alloy, Ti, Ti base alloy, Zr, Nb, Mo and the like, is interposed between the metallized layer and the metal piston body. A buffer metallic member having a coefficient of thermal expansion equal to or less than that of the ceramic pieces is more preferable. When the coefficient of thermal expansion of the buffer metallic member is smaller than that of the ceramic pieces, a compressive thermal residual stress develops within the ceramic pieces at the outside of the bonding boundary portion between the ceramic piece and the buffer metallic member during the cooling down to room temperature after bonding between the metallized layer coated on the ceramic piece and the buffer metallic member, because the amount of contraction of the buffer metallic member is smaller than that of the ceramic piece. However, since the ceramic material has a large resistance against compression stress, no fracture occurs in the ceramic piece at the bonding boundary portion. On the other hand, if the coefficient of thermal expansion of the buffer metallic member is larger than that of the ceramic piece, thermal residual tensile stress is unfavorably produced in the ceramic piece outside of the bonding boundary portion between the ceramic piece and the buffer metallic member. The magnitude of the thermal residual tensile stress produced in this case is determined depending upon the difference in the coefficient of thermal expansion between the ceramic piece and the buffer metallic member, the difference between the bonding temperature and room temperature, the modulus of elasticity of the ceramic piece, the bonding area and so on. However, whether the ceramic piece is broken by this thermal residual tensile stress or not depends upon the tensile strength of the ceramic material constituting the ceramic piece. For instance, taking the above-mentioned thermal residual tensile stress and the tensile strength of the ceramics as $\sigma_T$ and $\sigma_C$, respectively, the ceramic piece is not broken when $\sigma_C > \sigma_T$. Therefore, the meaning that the coefficient of thermal expansion of the buffer metallic member is equal to that of the ceramic piece in the present invention includes the following two meanings: One is a case where the coefficient of thermal expansion is equal between them and no thermal residual stress is produced. The other is a case where although the coefficient of thermal expansion of the buffer metallic member is larger than that of the ceramic piece, the thermal residual tensile stress caused in the ceramic piece thereby is smaller than the tensile strength of the ceramics. If the coefficient of thermal expansion of the buffer metallic member is often larger than $14 \times 10^{-6}(°C^{-1})$, the ceramic piece is unfavorably broken due to this thermal residual tensile stress.

In the assembled state of the ceramic pieces constituting the piston cap, it is preferable that no gaps are formed between the split faces thereof. If a gap is formed between the split faces of the adjacent ceramic pieces, ceramic fibers, $Al_2O_3$ base or $ZrO_2$-$SiO_2$-MgO base refractory cement may be filled into the gap as needed.

Now, the present invention will be explained more in detail with reference to embodiments specifically shown in the drawings, which are merely illustrative of the invention but should not be interpreted to limit the scope thereof.

FIG. 1 is a vertically sectional view of an embodiment of the internal combustion engine piston according to the present invention in which ceramic pieces constituting a piston cap are all bonded to the top portion of a metal piston body. This piston comprises a piston cap made of zirconia, buffer metallic members 13 made of titanium, and a piston body 10 made of a nodular graphite cast iron. The piston cap consists of concentrically split ceramic pieces 1, 2 and 3. The ceramic pieces 2 and 3 are divided into radially quartered portions.

The peripheral portion of each of the split portions of the ceramic piece is bevelled or rounded to avoid the stress concentration thereonto. The surface of each of the ceramic pieces 1-3 which is to be faced with and bonded to the metal piston body is coated with a metallizing layer (not shown) mainly consisting of Mo. The ceramic piece 3, and the ceramic pieces 1 and 2 are arranged on the outer periphery of the top portion of the piston body and a depression 11 formed at the top portion of the piston body, respectively through brazing.

This piston may be produced, for instance, in the following manner:

First, from partially stabilized zirconia containing 5% by weight of $Y_2O_3$ (hereinafter abbreviated as "PSZ") are produced a disc-like ceramic piece 1 of having a diameter of 77.0 mm, a central height of 11.4 mm, a height at the peripheral portion of 6.3 mm, a ceramic piece 2 of a radially quartered annular block having an inner diameter of 77.8 mm, an outer diameter of 113 mm, a height at the outer periphery of 16.5 mm and a height at the inner periphery of 6.3 mm, and a ceramic piece 3 of a radially quartered annular disc having an inner diameter of 113.2 mm, an outer diamter of 138 mm, and a thickness of 5 mm.

The entire surface of each of the ceramic pieces which is to be faced with and bonded to the metal piston body is coated with a pasty composition consisting of 80% by weight of Mo, 7% by weight of Mn, 3% by weight of $Al_2O_3$, and 10% by weight of $SiO_2$ in a film thickness of about 0.1 mm, which is dried and then heated at 1,300° C. for 10 hours in a mixed gas atmosphere of hydrogen and nitrogen which have been passed through a water bath heated at 40° C. This heating causes a reaction among the components in the composition coated onto the surface of PSZ, the heating atmosphere and PSZ, the interreaction among the components in the composition, and the mutual diffusion in the components between the composition and the PSZ, so that a metallized layer having a desired composition is formed on the surface of PSZ. The surface of the metallized layer thus formed on the metallized ceramic pieces is plated with Ni in a thickness of about 10 μm. Then, a disc-like buffer metallic member 13 made of titanium having a diameter of 77 mm, and a thickness of 3 mm, buffer metallic members 13 in the form of a radially quartered annular titanium disc and having a thickness of 3 mm, an inner diameter of 82 mm, and an outer diameter of 110 mm, or a thickness of 3 mm, an inner diameter of 113.2 mm, and an outer diameter of 140 mm are prepared. A depression into which the buffer metallic members 13 and the ceramic pieces 1-3 are to be arranged is machined into the top portion of the metal piston body, and the bonding surface of the piston cap is plated with Ni in a thickness of about 10 μm.

Thereafter, the ceramic pieces 1-3 and the buffer metallic members 13 are arranged on the top portion of the metal piston body as shown in FIG. 1, a silver-copper brazing alloy in a thickness of 0.1 mm is disposed between the opposite surfaces of each of the buffer metallic members 13 and the corresponding surface of the metallized layer of the ceramic pieces 1-3 and the bonding surface of the top portion of the metal piston body, and then brazing is effected in vacuum under heating.

Finally, the metal portion of the thus obtained piston is machined to obtain a piston having a configuration as shown in FIG. 1. The piston was assembled into a single cylinder diesel engine having a cylinder inner diameter of 139.7 mm, a stroke of 119.4 mm and was subjected to an engine test at 1,600 RPM. No abnormality was observed.

Figure 2A:
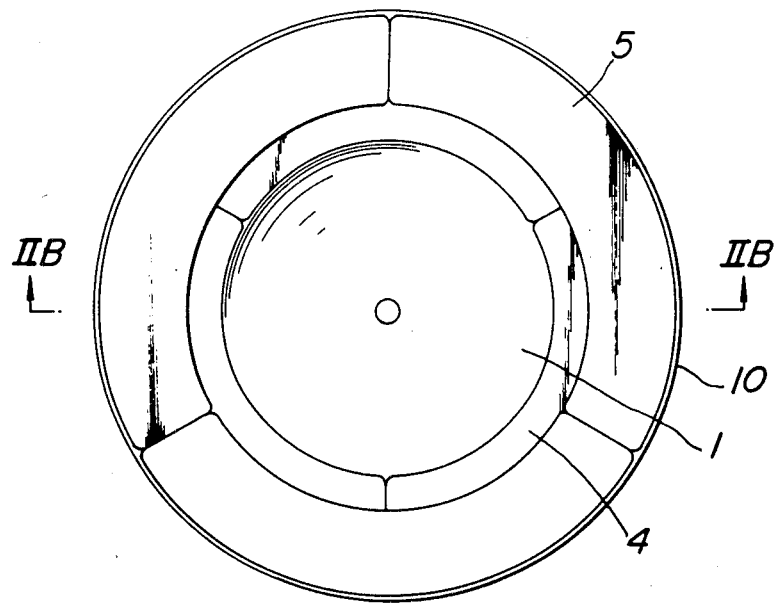
FIGS. 2A and 2B are a top plane view and a vertically sectional view seen from a direction of an arrow IIB—IIB of the structure of another embodiment of the internal combustion engine piston according to the present invention, respectively.
Figure 2B:
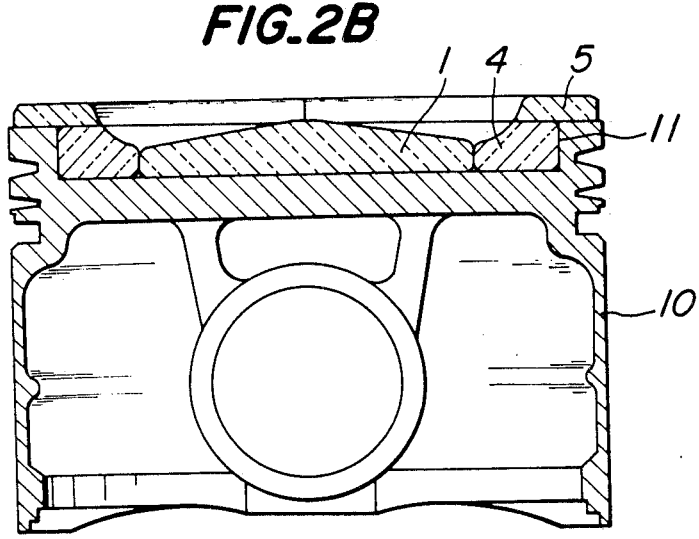

FIGS. 2A and 2B show a top plane view (FIG. 2A) and a vertically sectional view seen from an arrow IIB—IIB of an internal combustion engine piston according to the present invention in which a part of the ceramic pieces constituting a piston cap are bonded to a metal piston body through a metallized layer coated onto the ceramic pieces, the remaining ceramic pieces are fixed to the metal piston by means of the ceramic pieces bonded to the metal piston body. The piston comprises a piston cap made of zirconia and the piston body 10 made of nodular graphite cast iron. The piston cap consists of a round ceramic piece 1 and annular ceramic pieces 4 and 5 which are each radially split into trisect portions. The surface of each of the ceramic pieces 1 and 5, which is faced with and bonded to the metal piston body, is coated with a metallized layer (not shown). The ceramic piece 1 and the ceramic piece 4 which is machined to have the same height as the depth of the depression are arranged in the depression 11 formed in the top portion of the metal piston body, and the ceramic piece 1 is bonded to the piston body through the metallized layer. The ceramic piece 5 is arranged on the top portion of the piston body in such a manner that it is in contact with both the upper surface of the ceramic piece 4 and the top portion of the piston body, and bonded to the top of the piston body by way of the metallized layers. The ceramic piece 4 is fixed to the top of the piston body by means of the ceramic pieces 1 and 5.

This piston may be produced, for instance, in the following manner:

First, the ceramic pieces 1, 4 and 5 having desired configurations are produced from PSZ. In this case, machining is performed to form as narrow as possible the gap between the split surfaces between the adjacent ceramic pieces. Thereafter, the surfaces of each of the ceramic pieces 1 and 5, which are to be faced with and bonded to the top portion of the piston body, are coated with the metallized layer in the above-mentioned way, and the metallized layer is plated with Ni. Next, a depression 11 having such a given dimension that the ceramic pieces 1 and 4 are to be arranged therein is formed in the top portion of the piston body made of nodular graphite cast iron, and the top surface of the piston body which is to be bonded to the ceramic pieces is plated with Ni.

Thereafter, the ceramic pieces are arranged on the top portion of the piston body as shown in FIG. 2A, and the surface of the plated layer applied to metallized layer of each of the ceramic pieces and the corresponding bonding surface of the top portion of the piston body are bonded together by brazing. Finally, the metal portion of the thus obtained piston is subjected to a necessary machining to obtain a piston having a configuration shown in FIG. 2B.

Figure 3:
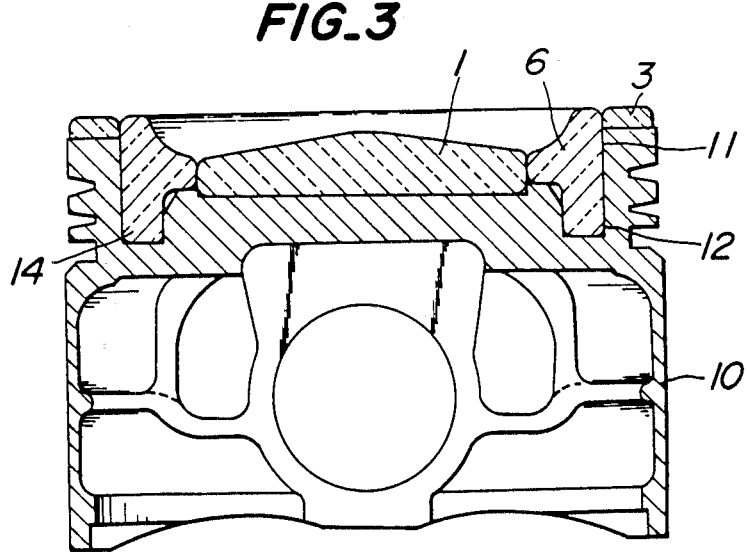
FIG. 3 is a schematical view illustrating a vertical section of a further embodiment of the internal combustion engine piston according to the present invention.

FIG. 3 is a vertically sectional view of an internal combustion engine piston according to the present invention in which a ceramic piece which is not bonded to a metal piston body through a metallized layer among those constituting a piston cap is fixed to the piston body through interference fitting.

This piston comprises a piston cap consisting of a ceramic pieces 1 and 3 made of zirconia and a ceramic piece 6 made of silicon nitride and a piston body made of nodular graphite cast iron. The ceramic piece 3 is radially split into trisect portions. A metallizing layer (not shown) is deposited onto the surface of each of the ceramic pieces 1 and 3 which are to be bonded to the metal piston body.

A depression 11 onto which the ceramic pieces 1 and 6 are to be arranged is formed on the top portion of the piston body 10, and a groove 12 into which the ceramic piece 6 is to be fitted is formed in the depression.

The ceramic pieces 1 and 3 are bonded to the top portion of the piston body through the metallized layers deposited onto the ceramic pieces, and the ceramic piece 6 is fitted into the groove 12.

This piston can be produced, for instance, in the following manner.

First, the ceramic pieces 1 and 3 having given configurations are prepared from PSZ, and the ceramic piece 6 having a given configuration is prepared from silicon nitride. In this case, the ceramic pieces are so machined that their split faces may stick to one another when the ceramic pieces are assembled as the piston cap.

Thereafter, the surface of each of the ceramic pieces 1 and 3, which is to be faced with and bonded to the top portion of the piston body, is coated with the metallized layer in the above-mentioned manner, and the thus coated metallized layer is placed with Ni. Then, the ceramic pieces 1 and 3 are arranged in place onto the top portion of the piston, and the metallized layers of the ceramic pieces and the corresponding top bonding surface of the piston body are bonded together through brazing.

Finally, after the ceramic piece 6 is cooled in liquid nitrogen, the projection 14 of the ceramic piece 6 is then fitted and fixed into the groove of the piston body which is kept at room temperature. The metal portion of the piston may be machined either prior to or after the fitting of the ceramic piece 6 into the piston body.

According to this piston, since the ceramic pieces 1 and 6 are fixed to the piston body, while being stuck to each other, when the engine is in operation and the temperature of the ceramic pieces is increased, the increase in the outer diameter of the ceramic piece 1 becomes larger than the increase in the inner diameter of the ceramic piece 6 to push the ceramic piece 6 against the side periphery of the projection 11 on the top portion of the piston body, thereby preventing the slip-out of the ceramic piece 6.

As obvious from the foregoing, according to the internal combustion engine piston of the present invention, since the piston cap fixed to the top portion of the metal piston body is constituted by the plurality of ceramic pieces, even when a large temperature difference occurs between the surface of the piston cap, which is subjected to a high temperature combustion gas, and the bottom portion of the piston cap, which is in contact with the metal piston body, the resulting thermal stress is sufficiently small to prevent fracture due to the thermal stress of the piston cap.

Further, according to the present invention, since the piston cap is constituted by the plurality of ceramic pieces, and the bonding area between the ceramic pieces and the metal piston body is reduced with the bonding area being varied depending upon the bonding location, the fracture of the ceramic pieces and the peel-off of the bonding surfaces do not occur.

In addition, according to the engine piston of the present invention, since the dimension of the ceramic pieces constituting the piston cap is small, and the configuration is simple, the ceramic pieces are not fractured due to the thermal stress even if the thickness of the ceramic piece is made larger, so that the combustion temperature of the engine can be raised without improving the thermal resistance of the metal piston body.

As mentioned above, according to the present invention, the internal combustion engine piston can be designed to have excellent heat insulating properties and heat resistance by utilizing the characteristics such as the heat insulating properties, the heat resistance, the corrosion resistance and so on of ceramic materials.

What is claimed is:

1. An internal combustion engine piston comprising a piston cap which includes a plurality of ceramic pieces, and a metal piston body, said metal piston body having a top portion, the piston cap being fixed to the top portion of the metal piston body, wherein the piston cap comprises at least one ceramic material, and said plurality of ceramic pieces comprising the ceramic cap are bonded to the metal piston body through a metallized layer coated upon said plurality of ceramic pieces and a metal-plated layer coated upon the metallized layer such that a bonding area created between said plurality of ceramic pieces and the metal piston body is greater at a central portion on top of the piston body than a bonding area between said plurality of ceramic pieces and the metal piston body at any other portion.

2. An internal combustion engine piston according to claim 1, wherein any ceramic piece bonded to the metal piston body determines a position on the metal piston body of any remaining ceramic pieces from said plurality of ceramic pieces.

3. An internal combustion engine piston according to claim 1, wherein at least one ceramic piece which is not bonded to the metal piston body is fixed to the metal piston body by interference fitting.

4. An internal combustion engine piston according to claim 1, wherein a buffer metallic member having a coefficient of thermal expansion less than or equal to a thermal expansion coefficient of the ceramic pieces coated with the metallized layer is provided between the metal plated layer coated onto the metallized layer and the metal piston body.

5. An internal combustion engine piston according to claim 1, wherein the ceramic pieces comprise at least one ceramic material selected from the group consisting of zirconia, alumina, silicon nitride, silicon carbide, and sialon.

6. An internal combustion engine piston according to claim 1, wherein each of said plurality of ceramic pieces comprising the ceramic cap have rounded outer peripheral portions.

7. A method of producing an internal combustion engine piston by fixing a piston cap, which includes a plurality of ceramic pieces, to a top portion of a metal piston body, which comprises the steps of: forming the piston cap from at least one ceramic material, coating the surface of at least one ceramic piece of said plurality of ceramic pieces comprising the piston cap which is to be faced with and bonded to the metal piston body with metallized layer, coating the surface of the metallized layer with a metal plated layer, arranging said plurality of ceramic pieces in a depression formed in said top portion of the metal piston body, and bonding the piston cap and the metal piston body together through the metallized layer on the ceramic pieces and the metal plated layer coated on the metallized layer, such that a bonding area created between said plurality of ceramic pieces and the metal piston body is greater at a central portion on top of the piston body than a bonding area between said plurality of ceramic pieces and the metal piston body at any other portion.

8. A method of producing an internal combustion engine piston according to claim 7, wherein any ceramic piece bonded to the metal piston body, determines a position on the metal piston body of any remaining ceramic pieces from said plurality of ceramic pieces.

9. A method of producing an internal combustion engine piston according to claim 7, wherein at least one ceramic piece which is not bonded to the metal piston body among those comprising the piston cap is fixed to the metal piston body by interference fitting.

10. A method of producing an internal combustion engine piston according to claim 7, wherein a buffer metallic member having a coefficient of thermal expansion less than or equal to a thermal expansion coefficient of the ceramic pieces coated with the metallized layer is provided between the metal plated layer coated onto the metallized layer and the metal piston body.

11. An internal combustion engine piston according to claim 7, wherein each of said plurality of ceramic pieces comprising the ceramic cap have rounded outer peripheral portions.

* * * * *

UNITED STATES PATENT AND TRADEMARK OFFICE
CERTIFICATE OF CORRECTION

PATENT NO. : 4,648,308
DATED : March 10, 1987
INVENTOR(S) : Minoru MATSUI et al.

It is certified that error appears in the above-identified patent and that said Letters Patent is hereby corrected as shown below:

In Claim 11, line 1, change "An internal combustion engine piston" to --A method of producing an internal combustion engine piston--.

Signed and Sealed this

Nineteenth Day of April, 1988

Attest:

DONALD J. QUIGG

*Attesting Officer*  *Commissioner of Patents and Trademarks*